(No Model.)
J. D. HOWELL.
WATCHMAKER'S GAGE.
No. 503,238. Patented Aug. 15, 1893.
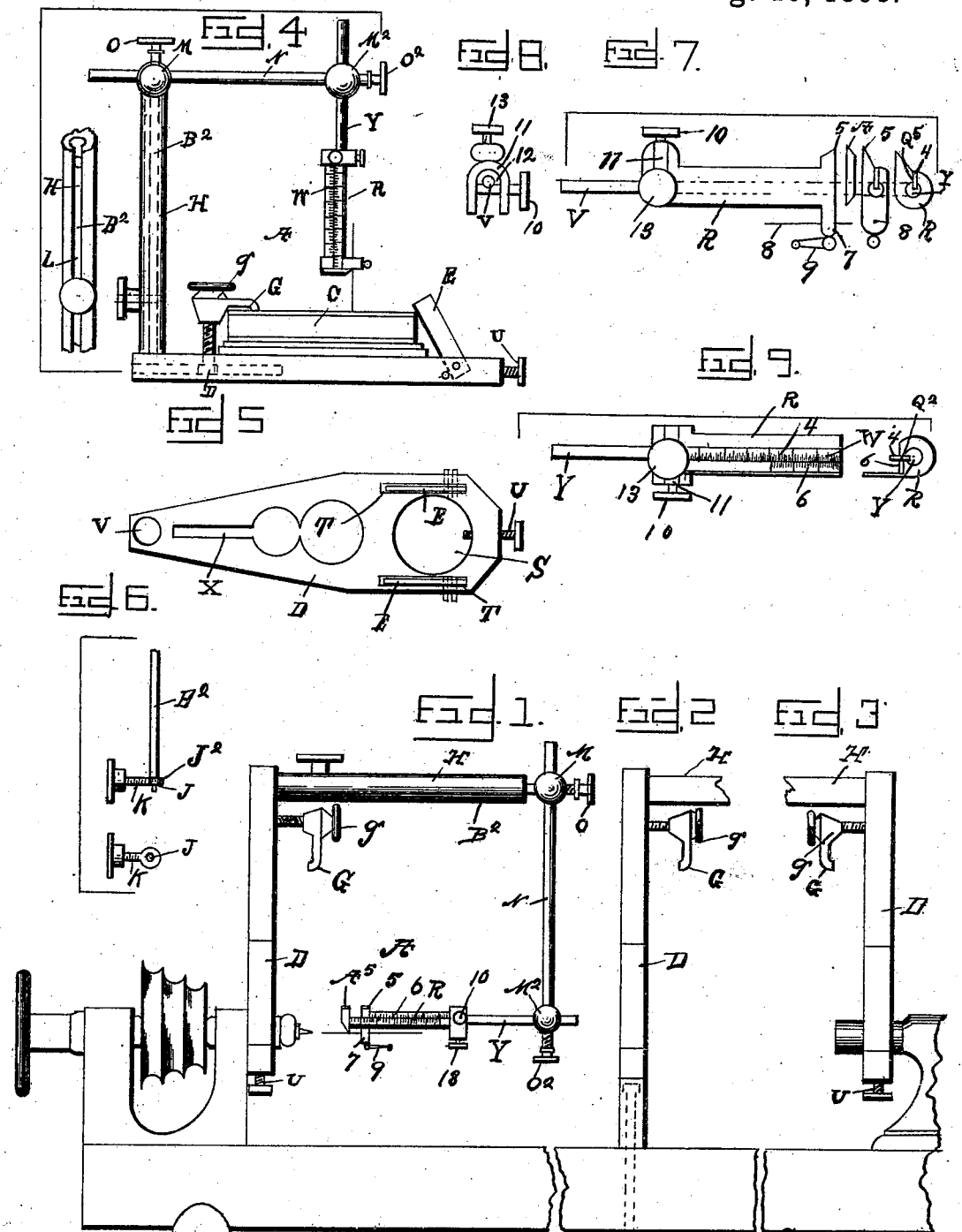
Witnesses
E. R. Shipley
W. S. Boyd
Inventor
Joshua D. Howell,
By E. B. Whitmore,
his Attorney.

UNITED STATES PATENT OFFICE.

JOSHUA DOUGHTY HOWELL, OF LIVONIA, NEW YORK.

WATCHMAKER'S GAGE.

SPECIFICATION forming part of Letters Patent No. 503,238, dated August 15, 1893.

Application filed August 29, 1892. Serial No. 444,471. (No model.)

*To all whom it may concern:*

Be it known that I, JOSHUA DOUGHTY HOWELL, a citizen of the United States, residing at Livonia, in the county of Livingston and State of New York, have invented a new Measuring-Tool for the Use of Watchmakers, of which the following is a specification.

My invention relates to watchmakers' tools and is a combination of a fine gage and an arm or base for fastening a watch movement to, while taking the delicate height and length measurements of watch work. The arm or base also is arranged to be attached to any watchmaker's lathe either in place of the dust ring to front oil hole or to the "ways" of the lathe or to the tail stock, for the purpose of transferring the measurements taken, to the work in the lathe.

The objects of my invention are first to provide a tool that by measuring as fine as one one thousandths of an inch will by applying it to a watch movement (as herein described) accurately take all the necessary heights and lengths of staffs, pinions, cylinders and jewels, and second, by attaching the same to the lathe, by an arm or base, will accurately transfer said measurements to the work in the lathe, making it possible to finish work before taking it from the lathe. I attain these objects by the mechanism illustrated in the accompanying drawings in which—

Figure 1:—is a view in elevation of the tool, shown removably attached to a lathe at the place of the dust ring of the oil cup. Fig. 2:—is a similar view, showing a modified form of supporting arm or base. Fig. 3, shows the arm or base as in Fig. 1, attached to the tail stock of a lathe. Fig. 4:— is a view in elevation of the tool detached, showing a watch-movement clamped in position on the arm or base, also showing, in detail, a portion of the standard. Fig. 5:— is a top plan view of the arm or base. Fig. 6:— is a view showing in detail the device for adjusting the inner or movable section of the standard. Fig. 7 is an enlarged view in elevation of the tool proper, showing portions thereof in detail. Fig. 8:— is an end elevation of the tool, showing the adjusting device for the movable scale rod. Fig. 9:—is an enlarged front elevation of the tool, showing by detail an end view of the same.

In the drawings: —D— indicates the support or base; —C— the watch movement; —H— a telescoping standard and —R— the gage.

Referring to Fig. 1, the entire tool is shown "attached" to a lathe at the place of the dust ring of the oil cup by a set screw U, or it may be attached to the lathe on its ways as at D or on the tail stock, as at D², Fig. 3.

Fig. 4 shows the same tool detached from the lathe with watch movement C fastened to the arm or base D by crowding the movement C against two inclined risers E. E. that are arranged to turn up from slots T, T in the surface of the arm D and then by following up the watch movement C by a clamp that moves toward the movement C in a longitudinal slot X. The clamp fastens down the watch movement C securely to the bed plate D and against both risers E. E. by forcing down the curved arm G on top of movement C by means of a screw nut g.

The standard H Fig. 4 projecting at right angles to the arm or base D is a hollow tube in which is fitted a spindle B² running nearly to the base of the tube H, at the end of which a pivot J² is turned which is fitted to the eye J and to this eye there is attached the screw K which projects out through the longitudinal slot L in H making it practicable to raise or lower B² in the tube H and fasten it at any position with the spindle turning freely in the eye J. At the outer or upper extremity of B², is a round head piece M through which runs another spindle N parallel with bed piece D and which is adjustable in the piece M by the set screw O. At the end of N is another head M², similar to M, to which is fastened the gage R by the set screw O² and projecting toward the base D.

Referring to Fig. 5:— S— represents an opening in the arm or base —D— by which it may be attached to the lathe, at the place for the dust ring of oil cup, by the set screw U, and also showing the slot X and the slots T. T. for the risers E. and E, also the place V of attaching the standard H.

R, indicates the gage which is made by sliding the cylinder W on a rod Y. The rod Y has a longitudinal slot sawed in it, in which is riveted the scale piece 4. This piece (4) runs in a slot Q⁵ cut nearly the length of the cylinder W. On one edge of the scale piece 4 there is made a scale of one-fiftieth of an inch divisions. This scale piece 4 comes up through the slot of cylinder and even with the outside of the same (W). On one edge of W is a vernier scale 6 taking nineteen one-fiftieths of an inch and dividing that length in twenty parts and which by using alongside of the central scale 4 enables us to measure the one-thousandth part of an inch. On the lower end of W a jaw 5 is formed projecting upward above the surface of the scales 4 and 6. On the lower end of the rod Y another jaw $A^5$ is fixed to correspond with jaw 5. On the opposite side from jaw 5 is a projection 7 through which a fine rod 8 is adjustable up or down parallel with the cylinder W and fastened at any position with the screw lever 9. The cylinder W to which is attached the vernier scale is moved up and down by the friction thumb piece 10 which runs through the cylinder W in such a position as to be in contact with rod Y at its back and kept in contact by the horseshoe shaped piece 11 through which it runs and which can be raised or lowered in its recess 12 in and around the upper end of W by the set screw 13, the pressure of 13 keeping the friction thumb piece 10 always in contact with back of rod Y and also furnishing the means of fastening the cylinder W when it is desired to keep a measurement for several trials. The fine rod 8 has a fine pivot point on its lower extremity which is used to project down in small pivot holes of watch movements or down to the bottoms of "sinks" of same from which it is desired to start vertical measurements or height measurements.

The jaws 5, and $A^5$ are for taking diameters of staffs, pinions, wheels, &c.

Having thus fully described my invention, what I claim, and desire to secure by Letters Patent, is—

1. In a watchmaker's tool, the combination, with a support provided with means for attaching it to a lathe and with means for holding an article to be measured, of a gage adjustably secured adjacent one side of said support, whereby the article may be located between the gage and the support substantially as set forth.

2. In a watchmaker's tool, the combination, with a support provided with a standard at one end a screw at the other, of means intermediate the standard and the screw for securing an article to said support, and a gage adjustably secured to the standard, adjacent one side of the support substantially as set forth.

3. In a watchmaker's tool, the combination, with a support provided with risers near one end thereof and a clamping nut adjustably secured to the support near the other end for holding an article to be measured and means for attaching the support to a lathe, of a standard at one end of the support and a gage adjustably secured adjacent one side of said support, substantially as set forth.

4. In a watchmaker's tool, the combination, with a support provided with means for holding an article to be measured, of means for attaching the support to a lathe, a tubular standard at one end of the support, a vertically adjustable spindle therein, and a gage adjustably secured to the spindle as specified.

5. In a watchmaker's tool, the combination, with a support provided with an opening and a set screw for attaching it to a lathe, and with clamps for securing an article to be measured, of a tubular standard, a rotatably mounted spindle vertically adjustable in the standard and a gage adjustably supported therefrom, as specified.

6. In a watchmaker's tool, the combination, with a support adapted to be attached to a lathe and provided with clamps and a tubular standard having a longitudinal slot therein, of a rotatably mounted and vertically adjustable spindle in the standard, a socket piece in which the spindle is stepped, a set screw engaging an extension of the socket piece, and a gage adjustably supported from the spindle, substantially as set forth.

7. In a watchmaker's tool, the combination, with a support adapted to be attached to a lathe and provided with a telescoping standard comprising a base section, an inner section and a socket piece vertically adjustable in the base section and having a threaded projection passing through a slot therein and a binding nut engaging the threaded projection, the inner section of the standard being rotatably mounted in the socket piece, of a gage adjustably supported therefrom, substantially as set forth.

8. In a watchmaker's tool, the combination, with a support provided with a telescoping standard comprising a base section and a rotatably mounted inner section, of a rod adjustably connected with said inner section and having a spherical head at one end thereof, and a gage adjustably secured in said head, substantially as set forth.

9. In a watchmaker's tool, the combination, with a support, of a gage adjustably connected therewith, said gage comprising a tubular body portion and a longitudinally movable adjustable scale rod mounted in the body portion, substantially as set forth.

10. In a watchmaker's tool, the combination, with a support, of a gage adjustably connected therewith, said gage comprising a tubular body portion, a rod mounted thereon a graduated scale bar carried by the rod projecting through a slot in the body portion, and the angular jaws at the extremities of said body portion and rod, substantially as set forth.

11. In a watchmaker's tool, the combination, with a support, of a gage adjustably connected therewith, said gage comprising a tubular body portion provided at one end with a T-head—and having the longer arm of an L-shaped rod adjustably secured in the bore of said body portion, a graduated scale bar carried by said L-shaped rod and a fixed scale adjacent the same, substantially as set forth.

12. In a watchmaker's tool, the combination, with a support, of a gage adjustably connected thereto, said gage comprising a movable and a stationary member, each being provided with a graduated scale bar, means for adjusting and retaining said movable member, a jaw at one end of the latter, and a T-head of the stationary member adjacent to said jaw, substantially as set forth.

JOSHUA DOUGHTY HOWELL.

Witnesses:
 JOHN L. RIDER,
 MARK Q. SMITH.